May 10, 1966  R. K. LOOK  3,250,465
CALCULATOR PROTECTION SYSTEM
Filed Nov. 14, 1963
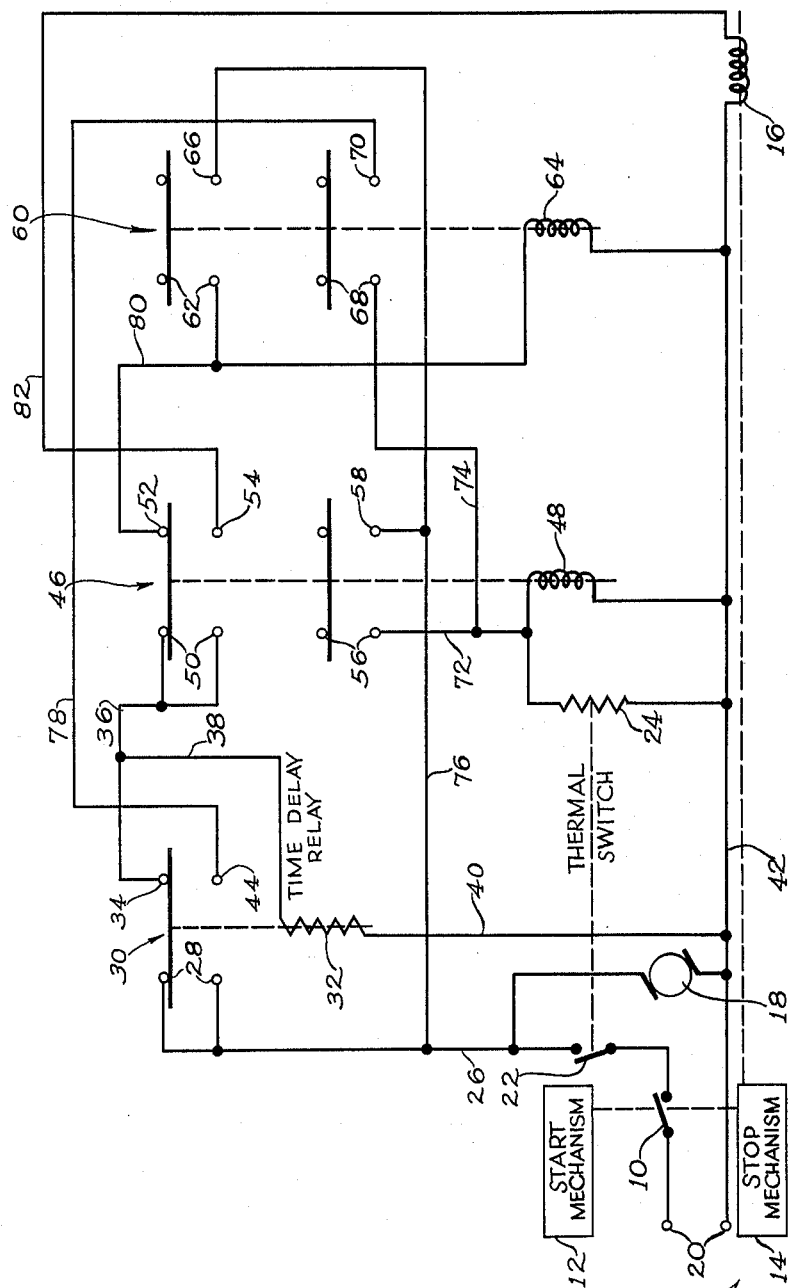
Inventor:
Richard K. Look
Gradolph, Love & Rogers
Attorneys United States Patent Office 3,250,465
Patented May 10, 1966

3,250,465
CALCULATOR PROTECTION SYSTEM
Richard K. Look, Chicago, Ill., assignor to Victor Comptometer Corporation, Chicago, Ill., a corporation of Illinois
Filed Nov. 14, 1963, Ser. No. 323,785
3 Claims. (Cl. 235—62)

The present invention relates to the mechanical calculator art, and is primarily concerned with the provision of a protection system to limit cycling of the calculator in the event of a malfunction of the type which produces continuous running.

Mechanical calculators which are capable of multiplication and division will cycle endlessly if the machine has been caused to divide by zero. Because of this, all mechanical calculators have some sort of a stop mechanism controlled by a button or the like, so that if the operator inadvertently divides by zero, he can push the stop button, after which the machine will cease its cycling and be conditioned for normal operation. In most machines, endless cycling will also occur if a number is set into the machine and the motor bar is inadvertently pressed twice. Those interested in inspecting a patent showing the general arrangement are referred to U.S. Patent No. 3,030,010, issued April 17, 1962, in the name of Oscar J. Sundstrand, for "Printing Calculating Machine."

In ordinary hand calculators the problem is not of much consequence because when the machine starts cycling endlessly, the operator will soon notice the condition and push the stop button. This, however, is not true of unmonitored automatic or remotely controlled calculators, and it is primarily with such calculators (referred to hereafter, for convenience, simply as "automatic calculators") that this invention is concerned.

Relatively low cost automatic calculating equipment can be and is being constructed making use of substantially standard desk model mechanical calculators, but so augmented that motor mechanisms (usually solenoids) are used to press the various number and control buttons and bars on the basis of electrical impulses supplied from some remote location, either manually or automatically, by appropriate circuitry. An example of a system of this general character forms the basis of United States Patent No. 2,497,784, issued February 14, 1950 in the name of Thomas O. Mehan and Hunter E. Hooe for "Calculating Machine and Remote Control Mechanism Therefor." When automatic calculators of the type discussed are used in applications where they may be unmonitored over a considerable period of time, such as when they are called upon to operate overnight without attention, the danger exists that because of some malfunction, either in the calculating machine or in the mechanism which supplies information to the calculator, the machine may start to cycle endlessly for the reasons given previously.

There are, in general, two deleterious results arising from endless cycling. One of these is that the machine in put out of action for the purpose of performing any subsequent calculations until it can be stopped and reconditioned for operation; and the second is that, in some calculators at least, the motor may overheat and burn out. Motor damage may be occasioned by the fact that motors used for calculator duty generally are called upon to provide a high torque, but only on an intermittent basis. Since motors for this type duty are never called upon in normal operation to run continuously, it is possible to supply a more compact mechanism by providing a motor which is perfectly adequate for its intended purpose, but which is designed upon the assumption that it will have a cooling period between operating cycles.

In view of the above, it is the principal object of the present invention to provide novel automatic mechanism for operating the stop control of a calculating machine when the mechanism determines that the machine has cycled for a somewhat longer period than the normal maximum.

Still another object is to provide the above in conjunction with additional novel mechanism which will operate subsequently to the first mechanism and which will stop operation of the machine in the event that the first protection system fails.

Yet another object is to provide the above in the form of an electrical accessory which can be attached to a remotely controlled calculator so as to make it unecessary to modify the mechanical structure of the calculating mechanism, thereby making use of the protection equipment optional.

The single figure of the drawing is a circuit diagram illustrating one form of mechanism embodying my invention.

Referring to the drawing, the switch in the calculator that is normally pressed to start a calculating cycle is indicated at 10. In the conventional desk model calculator, this switch is usually actuated by a motor bar, and in an automatic calculator is operated by a solenoid or the equivalent, which is indicated at 12, this mechanism, for convenience, being labeled "start mechanism." It will be appreciated that this start mechanism will vary to some extent as between different types of remotely controlled calculators, but, as stated, it will usually take the form of a simple solenoid which is so arranged that when it is energized it will press the motor bar or its equivalent and thus will close the switch 10.

The stop mechanism of the calculator is indicated at 14, and acts to stop the cycling of the calculator at an appropriate point and to open the switch 10. The solenoid, which operates the stop mechanism 14 when energized, is indicated at 16. The basic purpose of the circuitry to be described, therefore, is to energize the solenoid 16 under appropriate conditions so as to work the stop mechanism, which in turn opens the switch 10.

The motor circuit of the calculator is indicated at 18, and it is connected to the power input terminals 20 by way of the switch 10 previously referred to and a second protecting switch in series therewith, shown at 22. This switch 22 normally remains closed, but is arranged to be opened by a thermally actuated mechanism heated by the resistance element at 24.

Although calculators having different characteristics can be protected by appropriately timed energization of the solenoid 16 and operation of the thermal switch 22, in the interest of providing a specific disclosure it will be assumed that the maximum time the calculator may be called upon to perform a normal calculation is somewhat more than half a minute. This assumption is based upon a particular well known calculator which ordinarily is set to perform 180 strokes a minute and in which the maximum number of strokes ever necessary to perform a calculation involving division is 99. To be safe, therefore, the mechanism to be described is set to energize the solenoid 16 whenever the calculator has been in continuous operation for about a minute, or somewhat more under some conditions. The mechanism could be set to perform the stopping operation in less time, but by providing a comparatively wide margin for error, the possibility of malfunction is greatly reduced and, as a practical matter, appears to be substantially eliminated.

In the event, however, that for some reason the mechanism does not actuate the solenoid 16 in the manner described, the heating element 24 will operate as will be explained so as to open the switch 22 somewhat later. The time of operation of the switch 22 is somewhat variable because the temperature of the resistor 24 will not always be the same at the start of a continuous running cycle, but there is no difficulty in providing a thermally actuated switch of this character which will not operate under any conditions in less than three minutes or so, but which will operate under the longest conditions within something of the order of six minutes.

Overall functioning of the mechanism therefore acts to stop the calculating cycle within about a minute of the start of continuous running, and if this mechanism, for some reason, does not operate, the motor will be deenergized at least within six minutes, which is sufficient to save the mechanism from excessive wear and to protect the motor against damage.

The side of the power line from the input connections 20, which includes the switches 10 and 22, is indicated at 26, and this line is connected to the movable contact 28 of a single-pole double-throw relay indicated generally at 30. This relay is of the common time-delay type, and the contacts thereof are operated by the actuator 32 on a basis such that the relay shifts its position after the actuator 32 has been energized for a period of about 15 seconds. The contacts return to their original position about 45 seconds following deenergization of the actuator 32. In the normal "at rest" condition of the relay 30, contact 28 engages contact 34 which is connected to a lead 36, a branch 38 of which is connected to one terminal of the relay actuator 32. The other terminal of the actuator is connected by a lead 40 to the other side of the main line 42 which in turn is connected to the other terminal 20.

After the relay actuator 32 has been energized for 15 seconds or so, the relay movable contact 28 shifts its engagement from contact 34 to contact 44.

To the right of relay 30 there is a second relay 46 of the double-pole double-throw magnetic type in which the contacts are shifted upon a substantially instantaneous basis by its coil 48. One of the movable contacts 50 of this relay is connected to the previously mentioned lead 36 and in the unenergized condition of relay 46 this movable contact engages stationary contact 52. When the coil 48 is energized, contact 50 shifts away from contact 52 and engages contact 54. The other movable contact 56 of relay 46 is unconnected when the coil 48 is deenergized, but upon energization, contact 56 is connected to relay contact 58.

A third relay of the double-pole single-throw magnetic type is shown at 60. One of the movable contacts 62 of this relay is unconnected when the coil 64 thereof is deenergized, but engages contact 66 upon energization. The other movable contact 68 is unconnected until the coil 64 is energized, whereupon it shifts to contact 70.

Previously mentioned contact 56 of relay 46 is connected by a lead 72 to one end of relay coil 48 and to one end of the heater 24, the other ends of the elements 24 and 48 being connected to the other side of the line 42. Lead 72 is also connected by a branch 74 to contact 68 of relay 60. A lead 76, which is a branch of the line 26, is connected to relay contacts 58 and 66. Contact 44 of relay 30 is connected by a line 78 to contact 70 of relay 60. Contact 52 of relay 46 is connected to contact 62 of relay 60 by the line 80, which is also connected to one end of relay coil 64, the other end of which leads to the other side of the line at 42. Lead 72 is also connected by a branch 74 to contact 68 of relay 60. A lead 76, which is a branch of the line 26, is connected to relay contacts 58 and 66. Contact 44 of relay 30 is connected by a line 78 to contact 70 of relay 60. Contact 52 of relay 46 is connected to contact 62 of relay 60 by the line 80 which is also connected to one end of relay coil 64, the other end of which leads to the other side of the line at 42. Contact 54 of relay 46 is connected by a lead 82 to one end of the solenoid actuator 16 for the stop mechanism 14, the other side of this actuator 16 being connected to the line 42.

Although the terminal switch, made up of the contacts 22 and the actuator 24, may be of any suitable and conventional type, I prefer to use a snap action switch of this character, so that once it opens, it will stay open for a time before it recloses. The particular switch used opens in about six minutes from a cold condition at the start and recloses within about four additional minutes. Under some conditions it may open within three minutes or so, if it is still warm from a previous cycle.

The system operates in the following manner. When the start mechanism 12 is actuated to close the switch 10, thereby energizing the motor 18 for a calculating cycle, current will be conducted by way of the lead 26, contacts 28 and 34, to the line 38, and thus to the other side of the line 42 by way of the time delay relay actuator 32. Current also flows by way of the lead 36 and contacts 50, 52 to the lead 80, thereby energizing relay coil 64. Energization of coil 64 shifts relay contacts 62 and 68. Shifting of contacts 62 has no immediate effect upon the situation, since this merely connects the lead 80 back to the same side of the line 26 by way of the contacts 66 and lead 76. Shifting of contact 68 serves merely to connect line 72 with contact 44 by way of line 78, thereby having only a conditioning effect upon the system, since the connections are open at contacts 44 and 56.

If the calculating mechanism finishes its calculation in less than 15 seconds, relay 30 will not have time to shift its position, and therefore the system will be returned to normal by opening of contacts 10 at the end of the cycle. If the calculation exceeds about 15 seconds, the contacts of time delay relay 30 will be shifted. This connects the line 26, by way of contacts 28 and 44, to lead 78, to contact 70, and thence by way of contact 68 to lead 74. This energizes relay coil 48 and heating element 24.

When relay actuator 48 is energized, contact 56 engages contact 58, thereby establishing a holding circuit for relay 46 by way of line 26, branch 76, contacts 58 and 56, lead 72, and coil 48 connected to the other side of the line at 42. This holding circuit is also established through the heating element 24.

Shifting of relay 30 disconnects contact 34 and lead 36, and deenergizes relay actuator 32 so as to start cooling of the actuator 32. This returns the contacts of relay 30 to their original position after about an additional 45 seconds.

If during the 45 second cooling period referred to above, the calculator completes its cycle of operation, the switch 10 will be opened, thereby deenergizing the system. This returns relays 46 and 60 to their original position, but there may be some delay, up to 45 seconds, before relay 30 returns to normal, depending upon how long the element 32 had been cooling before switch 10 opened.

If now a new calculation is started while relay contacts 28 and 34 are still open, nothing happens, until contacts 28 and 34 reclose, whereupon the same situation arises as was previously described in connection with the original energization of the circuit with relay contacts 28 and 34 in engagement.

If, however, relay 30 is shifted after approximately 15 seconds or so in the manner previously described, and subsequently the calculator continues to cycle for an additional 45 seconds or so, the cooling of relay actuator 32 will cause the reclosing of contacts 28 and 34. When this occurs, current is supplied through contacts 28 and 34 to lead 36, and thence by way of contacts 50, 54 of relay 46 to lead 82 which is connected to the stop mechanism actuating solenoid 16. This causes operation of the stop mechanism 14, thereby opening the switch 10 and interrupting operation of the calculator until the calculator is restarted by subsequent actuation of the start mechanism 12. Opening of the switch 10, of course, returns relays 46 and 60 to their normal starting position, and relays 30 remains in its normal starting position, the latter having returned to this condition just prior to operation of the stop mechanism 14.

Under some conditions, normal operation of the system may take place in somewhat less time than indicated above. This is because relay actuator 32 may have been energized for almost fifteen seconds by the previous calculating cycle, but may not yet have shifted the contacts. If now a new calculating cycle is started immediately, the actuator 32 will shift its contacts in something less than fifteen seconds. Otherwise the cycle remains as explained above.

If for any reason the protective mechanism so far described does not function in the manner set forth, relay 46 will remain closed by way of the holding contacts 56 and 58, and under these conditions current will be continually supplied by way of lead 26, branch 76, contacts 58 and 56, lead 72, to the heating element 24. Eventually, therefore, in a matter of a maximum of six minutes and a minimum of something less than this, the temperature of heating element 24 will rise sufficiently to open the switch 22, thereby deenergizing the system and reconditioning the system for further operation upon the cooling of heater 24.

If desired, the thermally actuated switch 22 can be of the lock-open type, so that once it has been actuated by the heater 24 it will remain open until reset. I have found, however, that in most instances this is not necessary, nor in fact advisable. It is not necessary because the motor will cool sufficiently during the four minute cooling period of the heater mechanism 24 so as to afford protection for the motor even though the system should continue to cycle on and off. On the other hand, it seems that the most frequent cause for continuous cycling of the calculator is the presence of a momentary erroneous signal supplied thereto that is not likely to be repeated, or dirt in the mechanism which causes a slight sticking of some of the calculator elements which temporarily prevents these elements from returning to the stop position. Furthermore, it seems that almost always, when sticking occurs, stopping of the calculator has the effect of removing the difficulty. That is, stopping the calculator usually causes the stuck elements to become unstuck, with the result that the calculator can be put back into operation and will function satisfactorily thereafter.

Note that, assuming the calculator is provided with the start mechanism 12 and stop mechanism 14 and that the stop mechanism actuating solenoid 16 is already a portion of the automatic mechanism (which will usually be the case), or that it can be easily provided as an attachment (and this, of course, occasions no difficulty), the entire protective mechanism is electrically controlled and actuated and can be provided as an attachment wholly exterior to or even remote from the calculating mechanism. The only change that needs to be made in the calculator is to provide connections for the necessary electric leads to insert the switch 22 and to connect the line 42.

Although I have described my invention in connection with a specific embodiment thereof, it will be appreciated that variations can be made without departing from the spirit or scope of the invention, and that the scope of the invention is to be determined from the scope of the following claims.

Having described my invention, what I claim as new and useful and desire to secure by Letters Patent of the United States is:

1. A control system for an electric calculator having an electric motor and having a calculating cycle during which the motor is energized including a normal maximum duration calculating cycle and having a stop mechanism and an actuator therefor adapted to actuate said stop mechanism when electrically energized, comprising time delay relay means adapted when energized to shift from a first position to a second position after passage of a certain time interval and to return to its first position after passage of a second time interval, circuit means for energizing said time delay relay means and the motor contemporaneously with the start of a calculator cycle of operation, second relay means adapted when energized to shift from a first position to a second position, a primary circuit for energizing said second relay means when said time delay relay means is energized and in its first position, a secondary holding circuit for said second relay means for holding said second relay means in its second position until the end of a calculating cycle independently of said primary circuit, third relay means adapted to shift from a first position to a second position when energized, circuit means for energizing said third relay means when said second relay means is in its second position and said time delay relay means is in its second position and thereafter to cause said third relay means to remain energized until the end of a calculating cycle, said third relay means in its second position acting to interrupt said second relay primary circuit, circuit means for energizing said stop mechanism actuator when said time delay relay means is in its first position and simultaneously said third relay means is in its second position, and said certain time interval and said second time interval together being longer than the normal maximum duration calculating cycle for the calculator.

2. A control system for an electric calculator having an electric motor and having a calculating cycle during which the motor is energized including a normal maximum duration calculating cycle and having a stop mechanism and an actuator therefor adapted to actuate said stop mechanism when electrically energized, comprising time delay relay means adapted when energized to shift from a first position to a second position after passage of a certain time interval and to return to its first position after passage of a second time interval, circuit means for energizing said time delay relay means and the motor contemporaneously with the start of a calculator cycle of operation, second relay means adapted when energized to shift from a first position to a second position, a primary circuit for energizing said second relay means when said time delay relay means is energized and in its first position, a secondary holding circuit for said second relay means for holding said second relay means in its second position until the end of a calculating cycle independently of said primary circuit, third relay means adapted to shift from a first position to a second position when energized, circuit means for energizing said third relay means when said second relay means is in its second position and said time delay relay means is in its second position and thereafter to cause said third relay means to remain energized until the end of a calculating cycle, said third relay means in its second position acting to interrupt said second relay primary circuit, circuit means for energizing said stop mechanism actuator when said time delay relay means is in its first position and simultaneously said third relay means is in its second position, said certain time interval and said second time interval together being longer than the normal maximum duration calculating cycle for the calculator, and means operative to stop calculator operation a substantial time interval after the expiration of said certain time interval plus said second time interval if said stop mechanism has not been operated meanwhile.

3. A control system for an electric calculator having an electric motor and having a normal maximum duration calculating cycle and having a stop mechanism and an actuator therefor adapted to actuate said stop mechanism when electrically energized, comprising means for energizing said motor to start a calculating cycle, means for measuring a first time interval and adapted to start measuring contemporaneously with the energization of the motor and the start of a calculator cycle of operation, means for measuring a second time interval and adapted to start measuring at the conclusion of the measurement of the first time interval, the first of said measuring means being adapted to stop measuring upon the cessation of a calculator cycle of operation, the second of said measuring means being ineffective for measuring unless the first measuring means has concluded the measurement of the first time interval, circuit means for energizing said stop mechanism actuator when said means for measuring the second time interval has concluded its time interval measurement, said first time interval and said second time interval together being longer than the normal maximum duration calculating cycle for the calculator, a thermal switch adapted for deenergizing the motor after said thermal switch has been energized for a certain time interval, said certain time interval being longer than said second time interval, and circuit means connected for energizing said thermal switch at the start of measurement of said second time interval.

References Cited by the Examiner

UNITED STATES PATENTS

| | | | |
|---|---|---|---|
| 1,537,578 | 5/1925 | Bouton | 307—141.4 X |
| 1,952,299 | 3/1934 | Valkenburg | 317—141 X |
| 2,301,598 | 11/1942 | Weyenberg | 307—141.4 X |
| 2,387,646 | 10/1945 | Crosman | 318—471 X |
| 2,421,835 | 6/1947 | Durant | 307—141.4 X |
| 2,697,195 | 12/1954 | Courtney | 318—471 X |
| 3,142,013 | 7/1964 | McGrath | 318—484 X |
| 3,172,663 | 4/1965 | Goldstein | 318—484 X |

LEO SMILOW, *Primary Examiner.*

W. M. HOBBY, T. J. ANDERSON, *Assistant Examiners.*